(12) United States Patent
Jung et al.

(10) Patent No.: US 11,473,755 B2
(45) Date of Patent: Oct. 18, 2022

(54) ELECTRONIC APPARATUS COMPRISING SPEAKER MODULE, AND LIGHTING APPARATUS

(71) Applicant: Samsung Electronics Co., Ltd., Suwon-si (KR)

(72) Inventors: Iksu Jung, Suwon-si (KR); Changjin Yang, Suwon-si (KR); Changwoo Jung, Suwon-si (KR); Jinwoo Kim, Suwon-si (KR); Heejun Park, Suwon-si (KR); Minseok Shin, Suwon-si (KR); Sujin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/263,702

(22) PCT Filed: Aug. 28, 2019

(86) PCT No.: PCT/KR2019/011012
§ 371 (c)(1),
(2) Date: Jan. 27, 2021

(87) PCT Pub. No.: WO2020/045988
PCT Pub. Date: Mar. 5, 2020

(65) Prior Publication Data
US 2021/0372595 A1    Dec. 2, 2021

(30) Foreign Application Priority Data
Aug. 28, 2018    (KR) .................. 10-2018-0101206

(51) Int. Cl.
*F21V 33/00*    (2006.01)
*F21V 13/02*    (2006.01)
(Continued)

(52) U.S. Cl.
CPC ................ *F21V 13/02* (2013.01); *F21V 3/00* (2013.01); *F21V 7/05* (2013.01); *F21V 11/08* (2013.01);
(Continued)

(58) Field of Classification Search
CPC ... F21V 13/02; F21V 3/00; F21V 7/05; F21V 11/08; F21V 23/0485; F21V 33/0056; G06F 3/041; G02B 5/08; H04R 1/02
See application file for complete search history.

(56) References Cited

U.S. PATENT DOCUMENTS

| 2,069,368 A | 2/1937 | Horinstein |
| 2,114,711 A | 4/1938 | Horinstein |

(Continued)

FOREIGN PATENT DOCUMENTS

| JP | 6232128 B2 | 10/2017 |
| KR | 10-1778970 B1 | 9/2017 |
| KR | 10-2018-0075657 A | 7/2018 |

OTHER PUBLICATIONS

Extended European Search Report dated Jun. 14, 2021, issued in a counterpart European Application No. 19855642.5.

*Primary Examiner* — Zheng Song
(74) *Attorney, Agent, or Firm* — Jefferson IP Law, LLP

(57) ABSTRACT

An electronic apparatus according to an embodiment comprises: a housing including a first surface, a second surface facing the first surface, and a third surface which surrounds the inner space between the first surface and the second surface; a support member extending from the housing to the outside of the housing to support the housing; a speaker module arranged in the inner space; a first window arranged between the first surface and the speaker module and including a first light-transmitting surface facing the first surface and a first reflective surface facing away from the first light-transmitting surface; a second window arranged
(Continued)

between the first window and the first surface and including a second light-transmitting surface facing the first surface and a second reflective surface facing away from the second light-transmitting surface; a light source module arranged between the first window and the speaker module; and a light diffusion member arranged between the light source module and the first reflective surface. The first window may include a light-transmitting region formed on at least a portion of the first reflective surface, through which light diffused by the light diffusion member transmits. Other embodiments are possible.

16 Claims, 13 Drawing Sheets

(51) Int. Cl.
*F21V 3/00* (2015.01)
*F21V 7/05* (2006.01)
*F21V 11/08* (2006.01)
*F21V 23/04* (2006.01)

(52) U.S. Cl.
CPC ...... *F21V 23/0485* (2013.01); *F21V 33/0056* (2013.01)

(56) References Cited

U.S. PATENT DOCUMENTS

| | | | |
|---|---|---|---|
| 4,663,869 A * | 5/1987 | Nakagawa | G09F 13/12 40/219 |
| 8,851,731 B2 | 10/2014 | Zhang | |
| 9,659,577 B1 | 5/2017 | Langhammer | |
| 9,843,851 B2 | 12/2017 | Chamberlin et al. | |
| 9,894,428 B1 | 2/2018 | Chamberlin et al. | |
| 9,930,444 B1 * | 3/2018 | Stanley | H04R 7/18 |
| 10,015,584 B2 | 7/2018 | Johnson et al. | |
| 10,178,211 B2 | 1/2019 | Clementson et al. | |
| 10,200,781 B2 | 2/2019 | Yoo et al. | |
| 10,257,608 B2 | 4/2019 | Della Rosa et al. | |
| 10,425,712 B1 | 9/2019 | Chamberlin et al. | |
| 11,206,470 B1 * | 12/2021 | Gould | H04R 1/026 |
| 2013/0100642 A1 | 4/2013 | Zhang | |
| 2016/0061438 A1 | 3/2016 | Lu | |
| 2016/0119459 A1 | 4/2016 | Clementson et al. | |
| 2016/0345086 A1 * | 11/2016 | Chamberlin | H04R 1/028 |
| 2017/0055064 A1 | 2/2017 | Yoo et al. | |
| 2018/0087767 A1 | 3/2018 | Trainer et al. | |
| 2018/0091878 A1 * | 3/2018 | Della Rosa | H04R 3/12 |
| 2018/0091888 A1 | 3/2018 | Huwe et al. | |
| 2018/0091894 A1 | 3/2018 | Sheerin et al. | |
| 2018/0220213 A1 | 8/2018 | Wu et al. | |
| 2019/0230434 A1 | 7/2019 | Stanley et al. | |
| 2019/0394547 A1 * | 12/2019 | Lemons | G10L 15/28 |
| 2020/0304914 A1 * | 9/2020 | Mata Magana | H04R 1/025 |

* cited by examiner

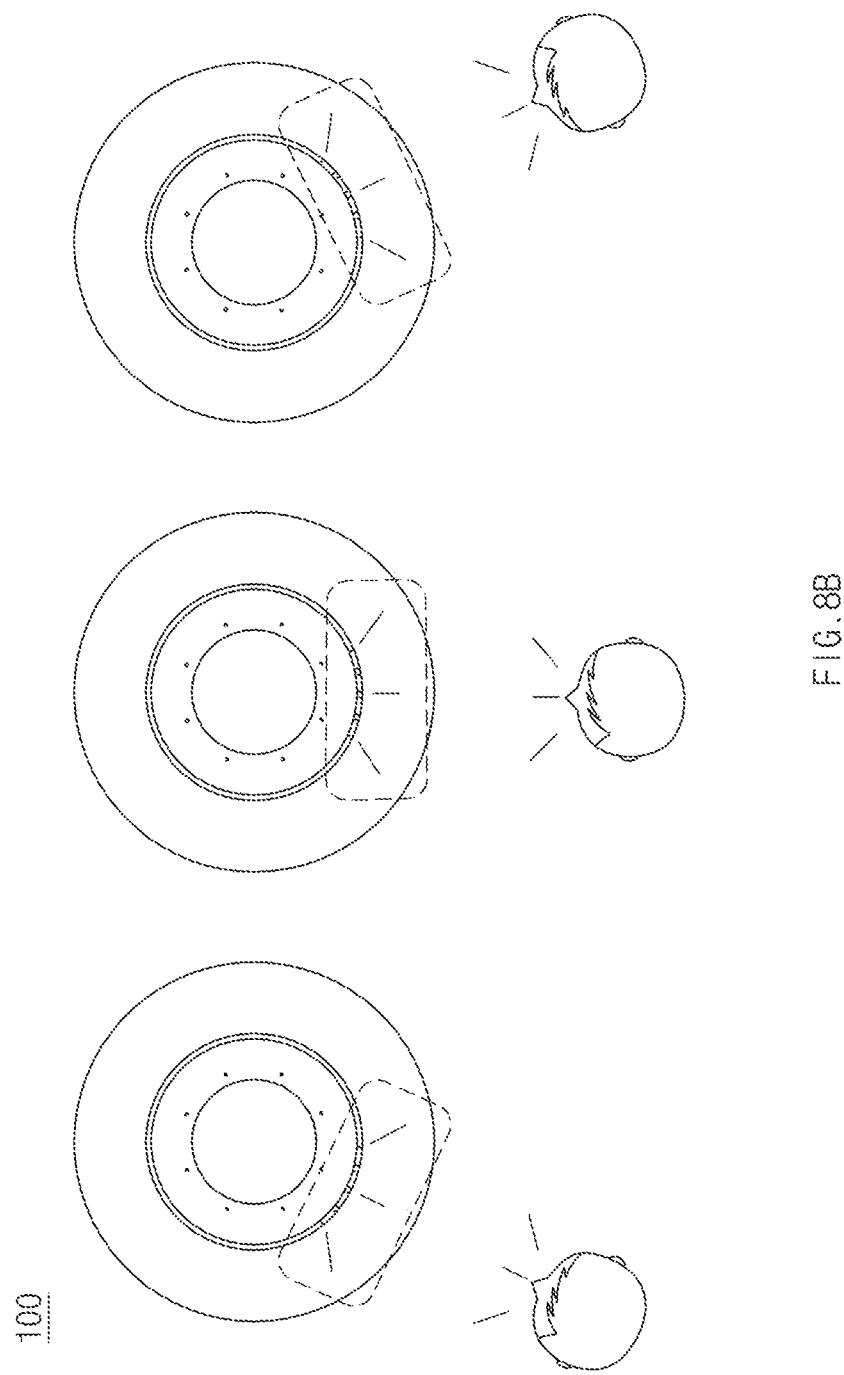

ELECTRONIC APPARATUS COMPRISING SPEAKER MODULE, AND LIGHTING APPARATUS

TECHNICAL FIELD

The disclosure relates to an electronic device including a speaker module, and a lighting device.

BACKGROUND ART

Recently, artificial intelligence speakers have been developed. The artificial intelligence speakers have been implemented by adding functions provided by artificial intelligence technology to existing speakers. The artificial intelligence speakers capable of judging and operating by themselves based on commands of users have been widely used.

An artificial intelligence speaker may communicate with a user by voice using an artificial intelligence algorithm. The artificial intelligence speaker including voice recognition technology and Internet of Things technology may control another electronic device based on a voice command of the user.

The artificial intelligence speaker may be placed in a noticeable space, such as a living room, to receive the voice command of the user and may further include a lighting module to provide an aesthetic sense.

DISCLOSURE

Technical Problem

Embodiments disclosed in the disclosure are aimed at providing an electronic device including a lighting unit for providing an aesthetic sense and outputting continuous light patterns in response to a voice command of a user.

Technical Solution

According to various embodiments, an electronic device includes a housing including a first surface, a second surface that faces the first surface, and a third surface that surrounds an interior space between the first surface and the second surface, a support member extending outward from the housing to support the housing, a speaker module disposed in the interior space, a first window that is disposed between the first surface and the speaker module and that includes a first light-transmitting surface that faces toward the first surface and a first reflective surface that faces away from the first light-transmitting surface, a second window that is disposed between the first window and the first surface and that includes a second light-transmitting surface that faces toward the first surface and a second reflective surface that faces away from the second light-transmitting surface, a light source module disposed between the first window and the speaker module, and a light diffusion member disposed between the light source module and the first reflective surface, and the first window includes a light-transmitting area formed in at least part of the first reflective surface to transmit light diffused by the light diffusion member.

According to various embodiments, a lighting device includes a housing, a light source module that is disposed in the housing and that includes one or more light-emitting elements, a light diffusion member disposed in the housing and disposed in a first direction of the light source module, a first window disposed in the housing and disposed in a first direction of the light diffusion member, and a second window that is disposed in a first direction of the first window and that forms a first surface of the housing. The first window and the second window include a first reflective surface and a second reflective surface, respectively, which face in a second direction. The first reflective surface has a first light transmittance, and the second reflective surface has a second light transmittance higher than the first light transmittance. A first area having a third light transmittance higher than the first light transmittance is formed in the first reflective surface to pass light diffused by the light diffusion member. A reflection space in which the light passing through the first area of the first reflective surface is repeatedly reflected is formed between the first reflective surface and the second reflective surface.

Advantageous Effects

According to the embodiments disclosed in the disclosure, damage to the plurality of windows by an external impact may be prevented by reducing or omitting the gap between the plurality of windows included in the electronic device.

In addition, the disclosure may provide various effects that are directly or indirectly recognized.

DESCRIPTION OF DRAWINGS

FIGS. 8A to 8C are views illustrating operations of the electronic device according to various embodiments.

MODE FOR INVENTION

Figure 1:
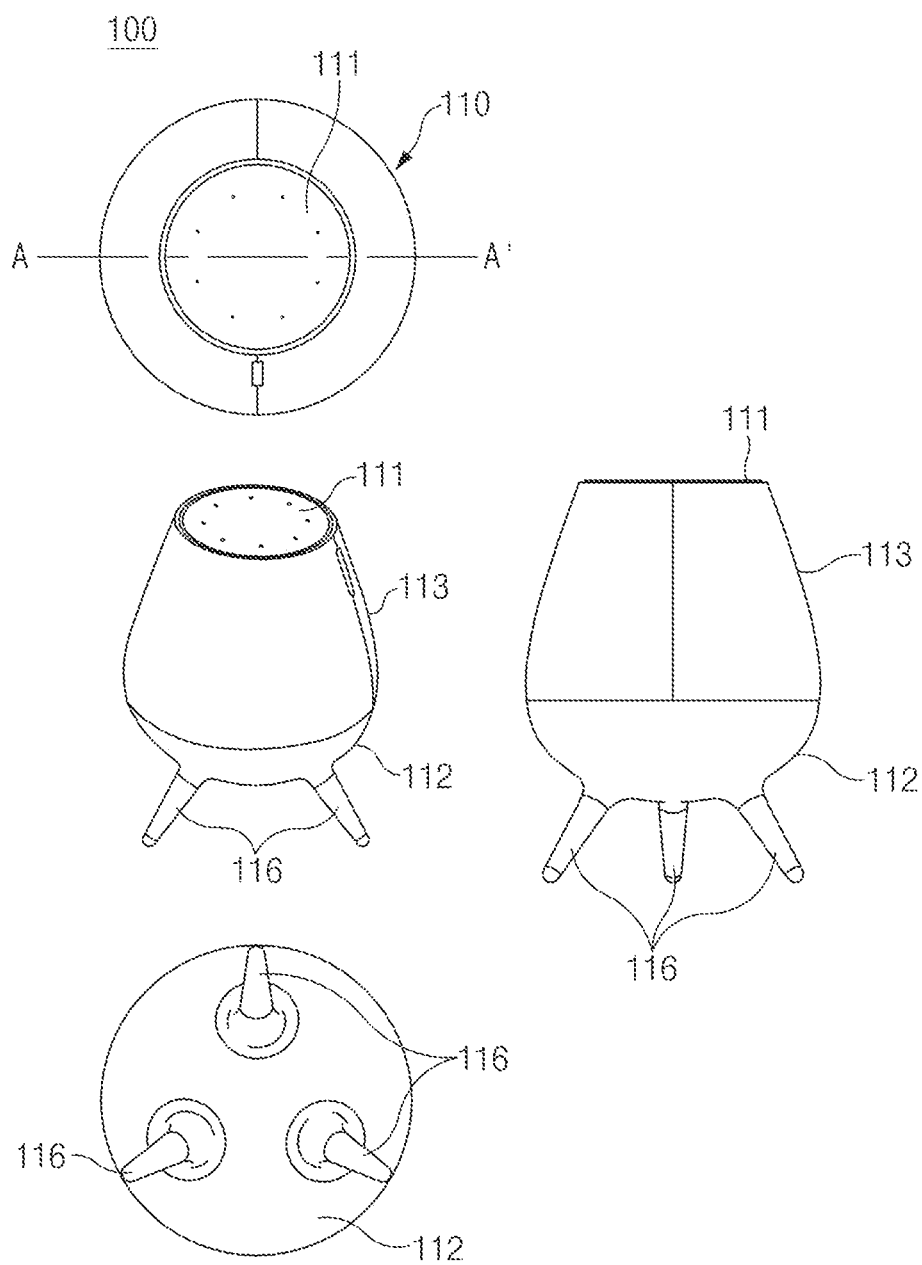
FIG. 1 is a view illustrating an electronic device according to an embodiment.

Hereinafter, various embodiments of the disclosure will be described with reference to the accompanying drawings. However, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a view illustrating an electronic device 100 according to an embodiment.

In an embodiment, the electronic device 100 may include a housing 110 and a support member 116 capable of supporting the housing 110 above the ground. Referring to FIG. 1, the housing 110 may include a first surface 111, a second surface 112 facing the first surface 111, and a third surface 113 surrounding a space between the first surface 111 and the second surface 112. The first surface 111 may be formed to be a flat surface. A second window 180 may be disposed on the first surface 111. The second surface 112 may be formed to be a curved surface. One or more support members 116 may extend from the second surface 112. The third surface 113 may connect the first surface 111 and the second surface 112. The third surface 113 may be formed to be a curved surface continuous from the second surface 112. In various embodiments, the specific shape of the housing 110 is not limited to that illustrated in FIG. 1, and the housing 110 may be formed in various shapes capable of forming an interior space.

In an embodiment, the support member 116 may extend to the ground from at least part of the second surface 112 and/or the third surface 113 of the housing 110. The support member 116 may include one or more support members and may be formed to balance the electronic device 100. However, the electronic device 100 does not necessarily include the support member 116, and for example, when the third surface 113 supported on the ground is formed to be flat, the support member 116 may be omitted.

In some embodiments, the electronic device 100 may include an upper housing 1101 and a lower housing 1102. The upper housing 1101 may include the first surface 111 and the second surface 112 that are illustrated in FIG. 1. The lower housing 1102 may include the third surface 113.

Figure 2:
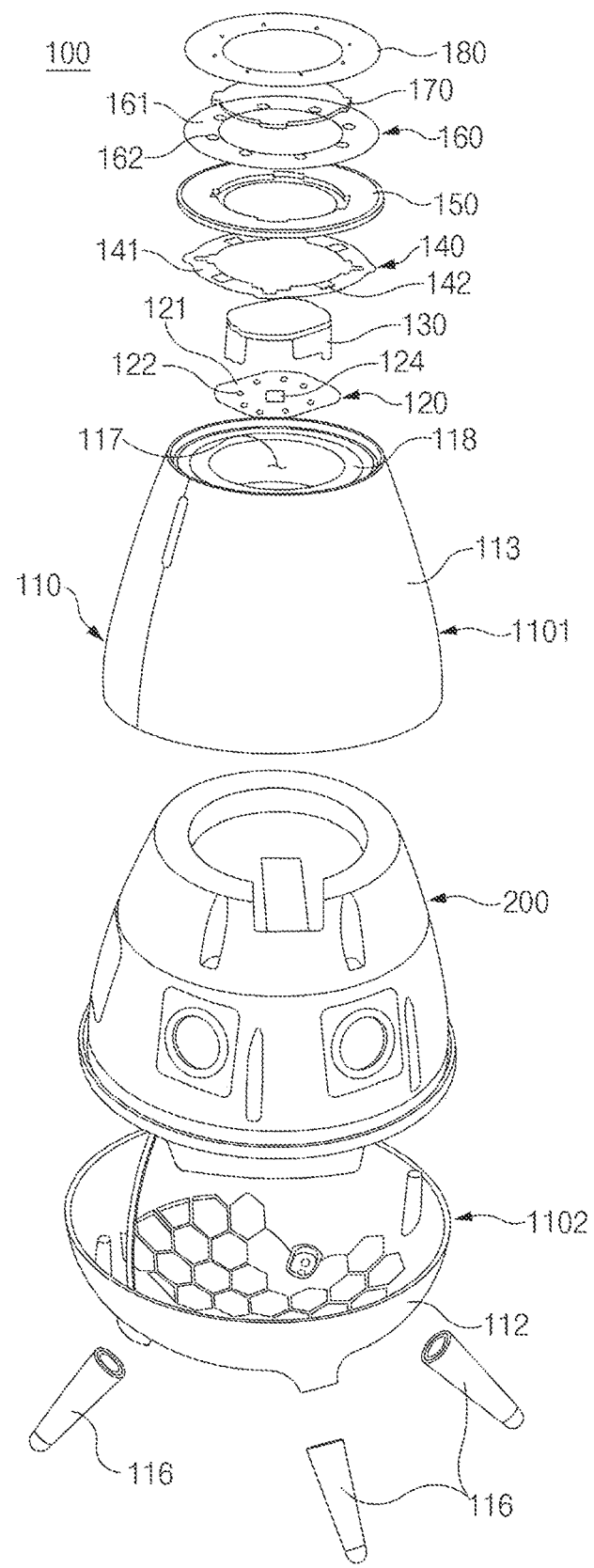
FIG. 2 is an exploded perspective view of the electronic device according to an embodiment.

FIG. 2 is an exploded perspective view of the electronic device 100 according to an embodiment.

Referring to FIG. 2, the electronic device 100 may include a first window 170, the second window 180, a touch screen panel 160, a microphone module 140, a support bracket 150, a light diffusion member 130, a light source module 120, and a speaker module 200. The aforementioned components may be contained in the housing 110.

In an embodiment, the housing 110 may include an inner bracket 118 that divides an upper space and a lower space. The first window 170, the second window 180, the touch screen panel 160, the microphone module 140, the support bracket 150, the light diffusion member 130, and the light source module 120 may be contained in the upper space. The speaker module 200 may be contained in the lower space. Referring to FIG. 2, the housing 110 may include a recess 117 formed by the inner bracket 118 and the inside of the second surface 112 of the housing 110. The aforementioned upper space of the housing 110 may include the recess 117.

In an embodiment, the lower space may be formed under the inner bracket 118, which is included in the housing 110, by part of the inner bracket 118, part of the second surface 112 of the housing 110, and the third surface 113. The speaker module 200 may be disposed in the lower space.

In an embodiment, the light source module 120 may be disposed in the recess 117. The light source module 120 may include a first PCB 121 and one or more light-emitting elements 122 disposed on the first PCB 121. The light-emitting elements 122 may include LED elements or OLED elements mounted on the first PCB 121. According to the illustrated embodiment, the one or more light-emitting elements 122 may be spaced at predetermined intervals from each other along the periphery of a second PCB 141.

In an embodiment, the light diffusion member 130 may be disposed in the recess 117 and may be disposed over the light source module 120. The light diffusion member 130 may diffuse light emitted from the light-emitting elements 122 included in the light source module 120. The light diffusion member 130 may contain an acrylic material. For example, the light diffusion member 130 may be formed of a translucent acrylic material. The light emitted from the light-emitting elements 122 may be softly diffused while passing through the light diffusion member 130.

In an embodiment, the microphone module 140 may be disposed on a support portion of the inner bracket 118 that is formed in a peripheral portion of the recess 117. The microphone module 140 may be supported by part of the periphery of the inner bracket 118. The microphone module 140 may include the second PCB 141 and one or more microphone elements 142 mounted on the second PCB 141. In the illustrated embodiment, the second PCB 141 may be formed in a ring shape in which an opening corresponding to the recess 117 is formed. The microphone elements 142 may be spaced at predetermined intervals from each other along the periphery of the second PCB 141.

In an embodiment, the support bracket 150 may be additionally disposed over the second PCB 141 of the microphone module 140. In the illustrated embodiment, the support bracket 150 may be formed in a ring shape. An opening corresponding to the recess 117 may be formed in a central portion of the support bracket 150. A peripheral portion around the opening may be disposed over the inner bracket 118. The support bracket 150 may support the touch screen panel 160 and the first window 170 from below.

In an embodiment, the touch screen panel 160 may be disposed over the support bracket 150. The touch screen panel 160 may include one or more touch electrodes 162. According to the illustrated embodiment, the touch screen panel 160 may be formed in a ring shape in which an opening corresponding to the recess 117 is formed in a central portion. A peripheral portion around the opening may be supported by the support bracket 150. The one or more touch electrodes 162 may be spaced at predetermined intervals from each other along the periphery of the touch screen panel 160.

In an embodiment, the first window 170 may be disposed over the light diffusion member 130 disposed in the recess 117. At least part of the periphery of the first window 170 may be disposed and supported on the support bracket 150. The first window 170 may be formed in a shape capable of being inserted into the recess 117.

In an embodiment, the second window 180 may form the first surface 111 of the housing 110. The second window 180 may be disposed over the first window 170 and the touch screen panel 160. The second window 180, together with the inner bracket 118 of the housing 110, may form the upper space of the housing 110.

In various embodiments, as illustrated in FIG. 2, the microphone module 140, the support bracket 150, and the touch screen panel 160 may be formed in a ring shape in which an opening is formed in a substantially central portion. Without being necessarily limited thereto, however, the microphone module 140, the support bracket 150, and the touch screen panel 160 may be formed in various shapes corresponding to the shape of the first surface 111 of the housing 110. Furthermore, as illustrated in FIG. 2, the first window 170 and the light diffusion member 130 may be formed in a circular shape. Without being necessarily limited thereto, however, the first window 170 and the light diffusion member 130 may be formed in various shapes corresponding to the shape of the recess 117 formed by the inner bracket 118. In various embodiments, the light diffusion member 130 may be formed in a shape corresponding to the shape of continuous light patterns desired to be formed (e.g., refer to FIG. 8A).

In some embodiments, the housing 110 may include the upper housing 1101 and the lower housing 1102. Here, the upper housing 1101 may include the second surface 112 of the housing 110 and the first surface 111 formed by the second window 180. The lower housing 1102 may include the third surface 113 of the housing 110. At least some of the light source module 120, the light diffusion member 130, the microphone module 140, the support bracket 150, the touch screen panel 160, the first window 170, and the second window 180 may be disposed in part of an interior space formed by the upper housing 1101. Furthermore, the speaker module 200 may be disposed in the remaining part of the interior space formed by the upper housing 1101 and in an interior space formed by the lower housing 1102.

Figure 3:
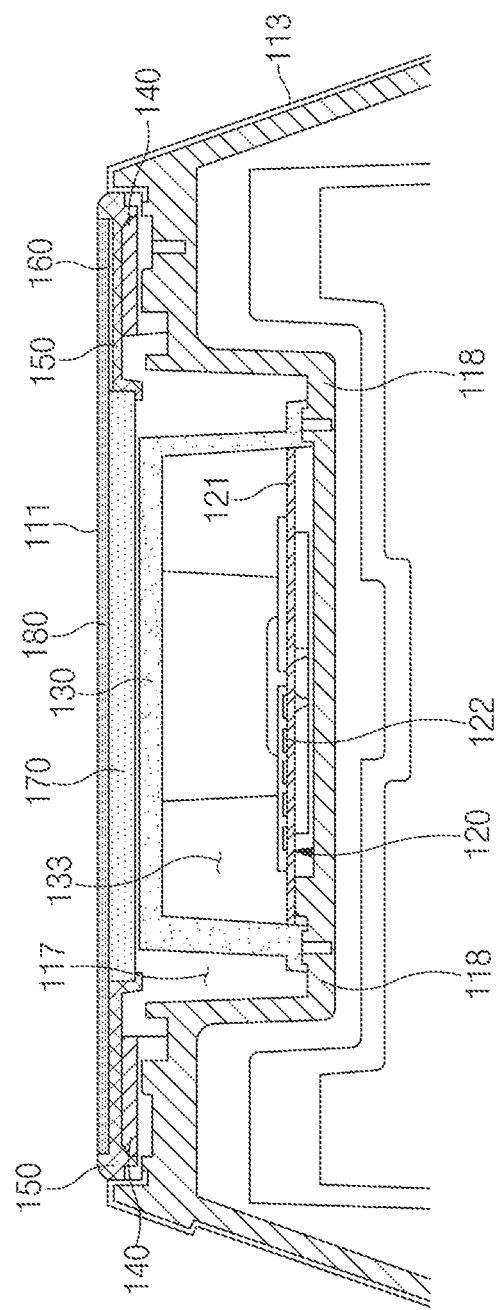
FIG. 3 is a sectional view taken along line A-A' illustrated in FIG. 1.

FIG. 3 is a sectional view taken along line A-A' illustrated in FIG. 1. FIG. 3 is a sectional view illustrating an upper side coupling of the electronic device 100 illustrated in FIG. 2.

In an embodiment, the electronic device 100 may include the light source module 120, the light diffusion member 130, the first window 170, and the second window 180 that are disposed in the recess 117 formed on the first surface 111 of the housing 110 and may include the microphone module 140, the support bracket 150, and the touch screen panel 160 that are disposed in the peripheral portion of the recess 117.

Referring to FIG. 3, the recess 117 may be formed by the inner bracket 118 coupled to the inside of the housing 110. The light source module 120 including the first PCB 121, on which the one or more light-emitting elements 122 are mounted, may be disposed in the recess 117. The light diffusion member 130 may include a light diffusion portion 131 parallel to the first PCB 121 and a support portion 132 extending from the light diffusion portion to the inner bracket 118. The support portion 132 may extend to the outside of the first PCB 121 included in the light source module 120. The light diffusion member 130 may form a space 133 inside the support portion 132 and under the light diffusion portion 131, and the light source module 120 may be disposed in the space 133. Accordingly, light emitted from the one or more light-emitting elements 122 included in the light source module 120 may be diffused by passing through the light diffusion portion 131 of the light diffusion member 130.

In an embodiment, the first window 170 may be disposed over the light diffusion portion 131 of the light diffusion member 130. At least part of the periphery of the first window 170 may be supported by the support bracket 150. The second window 180 may be disposed over the first window 170, and the support bracket 150, the touch screen panel 160, and the microphone module 140 may be disposed outside the first window 170. That is, the first window 170 may be inserted into the openings of the support bracket 150, the touch screen panel 160, and the microphone module 140 that are formed in a ring shape.

In an embodiment, the second window 180 may form the first surface 111 of the housing 110. A central portion of the second window 180 may be disposed over the first window 170, and a peripheral portion of the second window 180 may be disposed over the touch screen panel 160. Part of the support bracket 150 may be formed outside the second window 180. That is, part of the periphery of the support bracket 150 may surround the peripheral portion of the second window 180.

Figure 4:
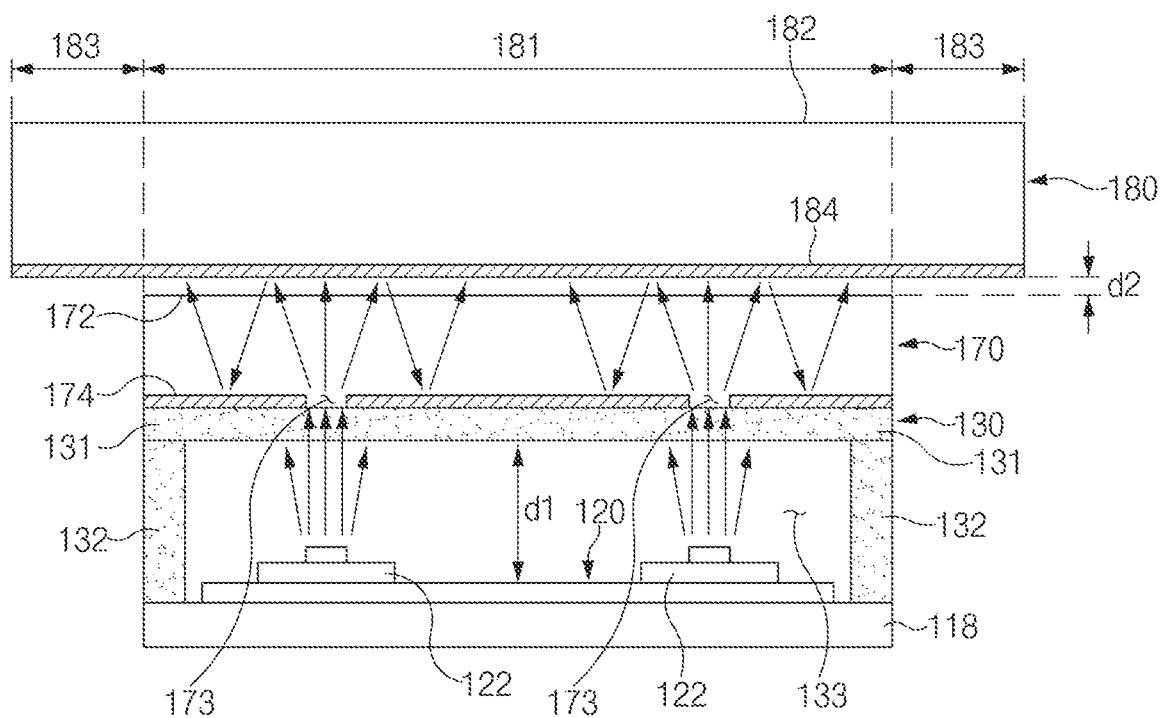
FIG. 4 is a blowup of a portion of the electronic device illustrated in FIG. 3.

FIG. 4 is a blowup of a portion of the electronic device 100 illustrated in FIG. 3. FIG. 4 is a detailed view illustrating the first window 170, the second window 180, the light diffusion member 130, and the light source module 120 that are illustrated in FIG. 3, and operation of the electronic device 100 according to an embodiment will be described below with reference to FIGS. 3 and 4.

In an embodiment, light may be emitted from the one or more light-emitting elements 122 mounted on the first PCB 121 of the light source module 120. The light emitted from the light-emitting elements 122 may travel to the light diffusion portion 131 of the light diffusion member 130 that is located over the first PCB 121. The first PCB 121 and the light diffusion portion 131 may be parallel to each other and may be spaced apart from each other at a predetermined interval d1.

In an embodiment, the first window 170 may include a first light-transmitting surface 172 located on an upper side with respect to the drawing and a first reflective surface 174 facing the first light-transmitting surface 172. The first window 170 may be disposed such that the first reflective surface 174 faces the light diffusion portion 131 of the light diffusion member 130 and the first light-transmitting surface 172 faces the second window 180. A first light-transmitting area 173 may be formed in at least part of the first reflective surface 174. The first light-transmitting area 173 may have a higher light transmittance than the other areas of the first reflective surface 174 to allow the light diffused while passing through the light diffusion member 130 to pass through the first window 170. The light diffused by the light diffusion member 130 may travel to a second reflective surface 184 of the second window 180 through the first light-transmitting area 173.

In an embodiment, the second window 180 may include a second light-transmitting surface 182 located on an upper side with respect to the drawing and the second reflective surface 184 facing the second light-transmitting surface 182. The second window 180 may be disposed such that the second reflective surface 184 faces the light diffusion portion 131 of the light diffusion member 130 and the second light-transmitting surface 182 forms the first surface 111 of the housing 110.

In an embodiment, a reflection space in which light is repeatedly reflected may be formed between the first reflective surface 174 of the first window 170 and the second reflective surface 184 of the second window 180. The first light-transmitting surface 172 of the first window 170 may be formed in the reflection space. Light entering the reflection space through the first light-transmitting area 173 may be repeatedly reflected in the reflection space. The reflected light repeatedly reflected in the reflection space may form continuous patterns. The gap between the continuous patterns may vary depending on the thickness of the first window 170 and the distance d2 from the first light-transmitting surface 172 to the second reflective surface 184. Alternatively, the gap between the continuous patterns may vary depending on the distance from the first reflective surface 174 to the second reflective surface 184. For example, the gap between the patterns may be increased as the distance from the first reflective surface 174 to the second reflective surface 184 is increased. Furthermore, each of the continuous patterns may have a shape corresponding to the shape of the first light-transmitting area 173 formed in the first reflective surface 174 of the first window 170. For example, the continuous patterns illustrated in FIG. 8A may appear when the first light-transmitting area 173 has a ring shape.

In various embodiments, the first window 170 and the second window 180 may be spaced apart from each other at the predetermined interval d2. When the predetermined interval d2 is excessively small, a deposit that forms the second reflective surface 184 may be damaged by being brought into contact with the first light-transmitting surface 172. In contrast, when the interval is excessively large, the second window 180 may be damaged by an external impact.

In various embodiments, the first window 170 and the second window 180 may be formed of a glass material having a predetermined light transmittance. The first reflective surface 174 and the second reflective surface 184 may be provided on the first window 170 and the second window 180 and may have predetermined reflectances through deposition processes. The first light-transmitting area 173 formed in at least part of the first window 170 may be an area where the deposition processes are not performed. The first light-transmitting area 173 may have the light transmittance of the first window 170 itself.

FIG. 5 is a view illustrating the positions of the light-emitting elements, the microphone elements, and microphone holes in an embodiment.

Referring to FIG. 5, the recess 117 may be formed on the first surface of the housing 110. The inner bracket 118 may be formed in the peripheral portion of the recess 117. The light source module 120 may be disposed in the recess 117. The microphone module 140 may be disposed over the inner bracket 118. As described above, the recess 117 may be formed in a substantially circular shape. Without being limited thereto, however, the recess 117 may be formed in various shapes.

Figure 5A:
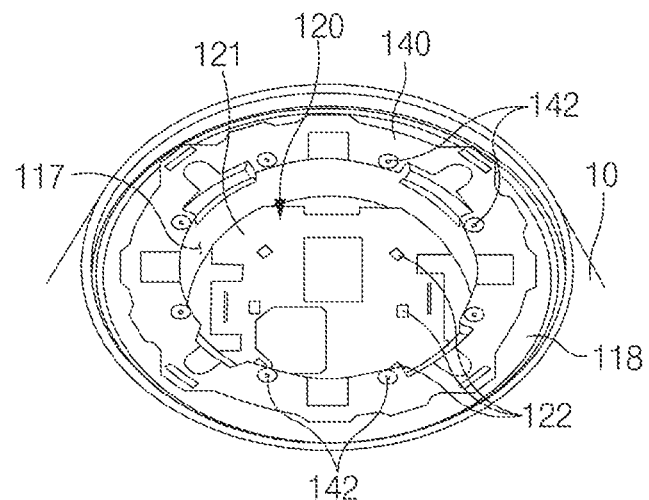
FIGS. 5A to 5C are views illustrating the positions of the light-emitting elements, the microphone elements, and microphone holes in an embodiment.

Referring to FIG. 5(a), the light source module 120 disposed in the recess 117 may include the PCB 121 and the plurality of light-emitting elements 122 mounted on the PCB. The plurality of light-emitting elements 122 may be disposed in a radial direction from a central portion of the PCB 121. The plurality of light-emitting elements 122 may be spaced apart from each other at predetermined angles along a circumferential direction (or, the periphery) of the PCB 121. Meanwhile, the microphone module 140 disposed over the inner bracket 118 may include the plurality of microphone elements 142. The plurality of microphone elements 142 may be disposed in a radial direction from a central portion of the recess 117. The plurality of microphone elements 142 may be spaced apart from each other at predetermined angles along a circumferential direction (or, the periphery) of the microphone module 140.

In an embodiment, the plurality of microphone elements 142 may be disposed in positions substantially corresponding to the plurality of light-emitting elements 122, respectively. The plurality of microphone elements 142 may be disposed radially outward from the center of the recess 117, and the plurality of light-emitting elements 122 may be disposed radially inward from the plurality of microphone elements 142.

In an embodiment, the angles at which the plurality of microphone elements 142 are spaced apart from each other may be substantially the same as the angles at which the plurality of light-emitting elements 122 are spaced apart from each other.

Figure 5B:
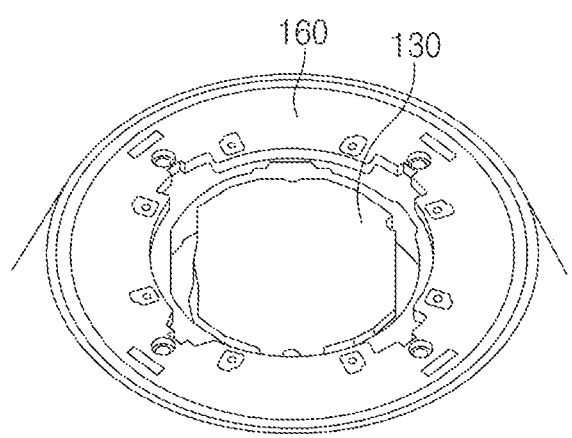

Referring to FIG. 5(b), the touch screen panel 160 may be disposed over the microphone module 140. The light diffusion member 130 may be disposed over the light source module 120.

Figure 5C:
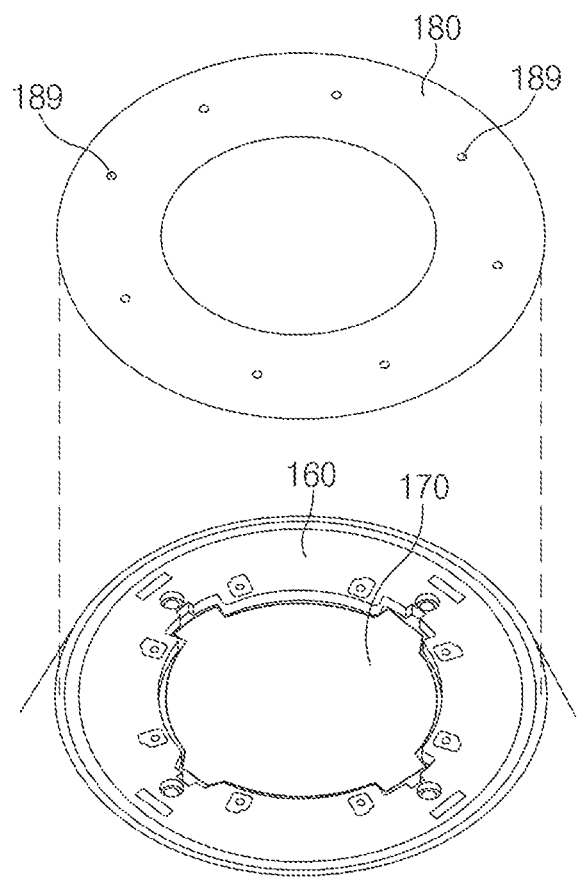

Referring to FIG. 5(c), the second window 180 may be disposed over the touch screen panel 160 and the light diffusion member 130. Microphone holes 189 corresponding to the plurality of microphone elements 142, respectively, may be formed in the second window 180. An external voice signal may be input to the microphone elements 142 through the microphone holes 189.

The electronic device according to an embodiment may be configured such that when an external voice signal is input to some of the microphone elements 142 through the microphone holes 189, some of the light-emitting elements 122 that are formed in positions corresponding to the some of the microphone elements 142 emit light. When the some of the light-emitting elements 122 emit the light, light patterns may be formed on the second window 180. The light patterns may be formed in positions corresponding to the light-emitting elements 122 that emit the light and may represent the direction of the external voice signal.

An electronic device according to various embodiments may be configured to differently adjust the brightness of light-emitting elements corresponding to microphone elements depending on the magnitudes of voice signals input to the microphone elements. For example, the electronic device may be configured such that a light-emitting element corresponding to a microphone element close to an external voice signal emits brighter light than a light-emitting element corresponding to a microphone element far away from the external voice signal.

Figure 6A:
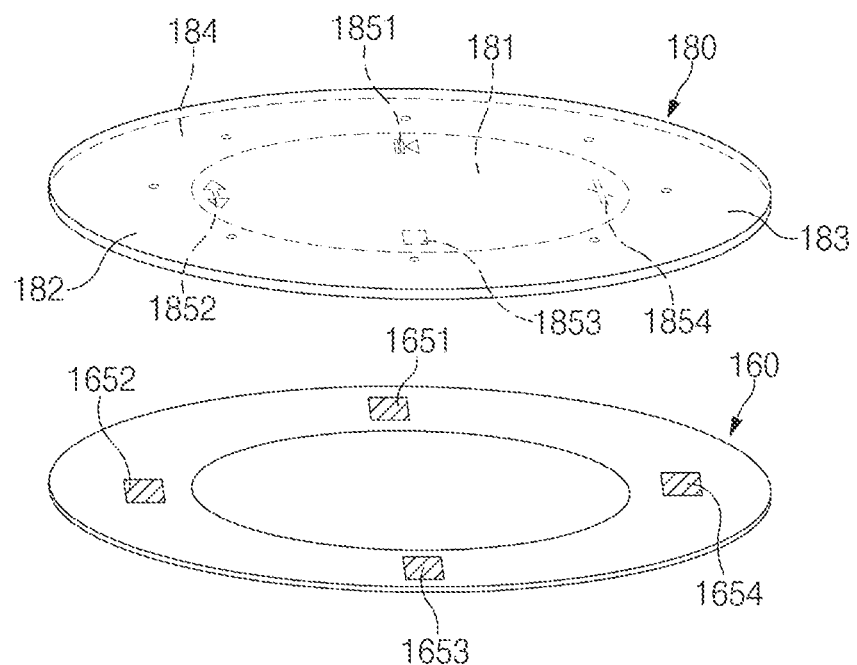
FIGS. 6A to 6B are views illustrating a first window, a second window, and a touch screen panel of the electronic device according to an embodiment.
Figure 6B:
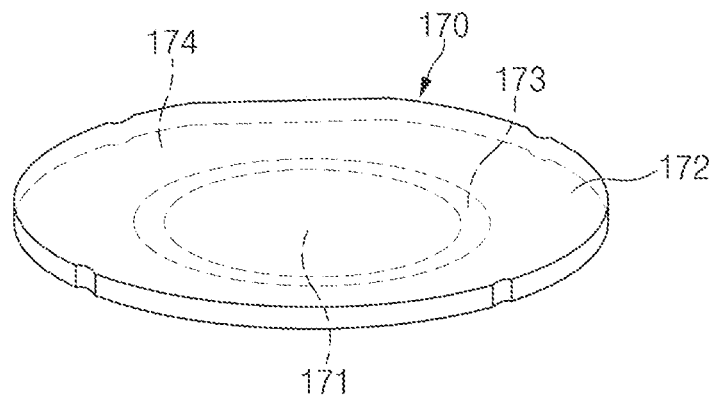

FIG. 6 is a view illustrating the first window 170, the second window 180, and the touch screen panel 160 of the electronic device 100 according to an embodiment.

Referring to FIG. 6, the first window 170 may include the first reflective surface 174 facing the first light-transmitting surface 172. The first light-transmitting area 173 may be formed in at least part of the first reflective surface 174. In the illustrated embodiment, the first light-transmitting area 173 may be formed in a ring shape or a donut shape, but is not necessarily limited to the illustrated shape. As described above, the first light-transmitting area 173 may be an area where a deposition process for forming a reflective surface is not performed, or an area where no deposit is deposited. The first light-transmitting area 173 may have a higher light transmittance than the other areas of the first reflective surface 174.

In an embodiment, the second window 180 may include a display area 181 and a touch area 183 surrounding the display area 181. The display area 181 may substantially correspond to the first window 170 and the opening area formed in the touch screen panel 160. The touch area 183 may substantially correspond to the touch screen panel 160. Accordingly, as diffused light passes through the first light-transmitting area 173 of the first window 170, continuous patterns formed between the first reflective surface 174 of the first window 170 and the second reflective surface 184 of the second window 180 may be displayed on the display area 181. At this time, the continuous patterns may have a shape corresponding to the shape of the first light-transmitting area 173. Furthermore, buttons 1851, 1852, 1853, and 1854 related to operations of the electronic device 100 or the speaker module 200 may be displayed on the display area 181. Meanwhile, a user may touch the touch area 183 to operate touch buttons 1651, 1652, 1653, and 1654 disposed under the touch area 183.

In an embodiment, the second window 180 may include the second reflective surface 184 facing the second light-transmitting surface 182. The second reflective surface 184 may be included in the display area 181 and the touch area 183. Second light-transmitting areas 1851, 1852, 1853, and 1854 may be formed in at least parts of the second reflective surface 184 included in the display area 181. The second light-transmitting areas 1851, 1852, 1853, and 1854 may have a higher light transmittance than the remaining area of the second reflective surface 184, and part of light passing through the first light-transmitting surface 172 of the first window 170 may pass through the second light-transmitting areas 1851, 1852, 1853, and 1854. Accordingly, light corresponding to the shapes of the second light-transmitting areas 1851, 1852, 1853, and 1854 may be displayed on the display area 181 of the second window 180.

In the illustrated embodiment, the second light-transmitting areas 1851, 1852, 1853, and 1854 may be formed in button shapes related to operations of the electronic device 100 or the speaker module 200. For example, referring to FIG. 6, the second light-transmitting areas 1851, 1852, 1853, and 1854 may include light-transmitting area 2-1 1851 related to playback/pause of the electronic device 100 or the speaker module 200, light-transmitting area 2-2 1852 related to track/file transfer, light-transmitting area 2-3 1853 related to stop, and light-transmitting area 2-4 1854 related to random playback.

Referring to FIG. 6, the touch screen panel 160 may include one or more touch buttons 1651, 1652, 1653, and 1654. The touch buttons may be spaced apart from each other at predetermined intervals along the direction of the periphery of the touch screen panel 160. In an embodiment, shapes displayed on the display area 181 through the second light-transmitting areas 1851, 1852, 1853, and 1854 may correspond to the touch buttons 1651, 1652, 1653, and 1654 of the touch screen panel 160, respectively.

For example, an operation of the electronic device 100 or the speaker module 200 that light-transmitting area 2-1 1851 indicates may be performed by touching the first touch button 1651. That is, when a touch on the first touch button 1652 is detected, the electronic device 100 or the speaker module 200 may play/pause.

In another example, light-transmitting area 2-1 1851 and the first touch button 1651 may be disposed adjacent to each other. That is, the shapes of the second light-transmitting areas displayed on the display area 181 may be disposed along the direction of the periphery of the display area 181. The touch buttons 1651, 1652, 1653, and 1654 may be disposed along the direction of the periphery of the touch screen panel 160. Accordingly, the user may operate the electronic device 100 or the speaker module 200 by touching the touch area 183 outside, or adjacent to, an area where a button related to an operation of the electronic device 100 is displayed to indicate the operation.

In various embodiments, the first reflective surface 174 of the first window 170 may have a first light transmittance. The second reflective surface 184 of the second window 180 may have a second light transmittance. As the second light transmittance is higher than the first light transmittance, a part of the continuous patterns formed in the reflection space between the first reflective surface 174 and the second reflective surface 184 may be displayed on the second light-transmitting surface 182 of the second window 180.

The first window 170 may have a third light transmittance, and the first reflective surface 174 of the first window 170 may have a light transmittance lower than the third light transmittance. Accordingly, most of light incident on the first reflective surface 174 may be reflected by the first reflective surface 174. The first light-transmitting area 173 formed in the first reflective surface 174 may have a fourth light transmittance. The first light-transmitting area 173 may be a non-deposited area where a deposit for forming the first reflective surface 174 is not formed. Accordingly, the fourth light transmittance, which is the light transmittance of the first light-transmitting area 173, may be substantially the same as the third light transmittance of the first window 170.

The second window 180 may have a fifth light transmittance, and the second reflective surface 184 of the second window 180 may have a light transmittance lower than the fifth light transmittance. Accordingly, most of light incident on the second reflective surface 184 may be reflected by the second reflective surface 184. The second light-transmitting areas 1851, 1852, 1853, and 1854 formed in the second reflective surface 184 may have a sixth light transmittance. The second light-transmitting areas 183 may be non-deposited areas where a deposit for forming the second reflective surface 184 is not formed. Accordingly, the sixth light transmittance, which is the light transmittance of the second light-transmitting areas 183, may be substantially the same as the fifth light transmittance of the second window 180.

In various embodiments, as the fourth light transmittance becomes higher, the brightness of the continuous patterns displayed on the display area 181 of the second window 180 may increase. As the sixth light transmittance becomes higher, the brightness of the button shapes displayed on the display area 181 of the second window 180 may increase.

Figure 7:
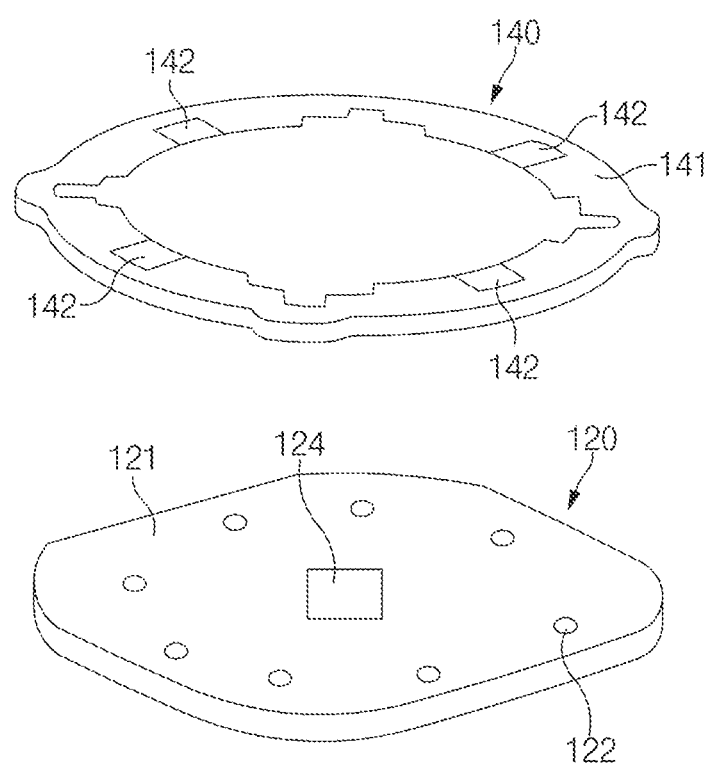
FIG. 7 is a view illustrating a microphone module and a light source module of the electronic device according to an embodiment.

FIG. 7 is a view illustrating the microphone module 140 and the light source module 120 of the electronic device 100 according to an embodiment.

Referring to FIG. 7, the microphone module 140 may include the second PCB 141 having a ring shape in which an opening is formed in a central portion and the one or more microphone elements 142 mounted on the second PCB 141. The microphone elements 142 may be spaced at predetermined intervals or angles from each other along the direction of the periphery of the second PCB 141. Meanwhile, the light source module 120 may include the first PCB 121 disposed under the second PCB 141, the one or more light-emitting elements 122 mounted on the first PCB 121, and a processor 124. The light-emitting elements 122 may be spaced at predetermined intervals or angles from each other along the direction of the periphery of the first PCB 121. The microphone elements 142 of the microphone module 140 and the light-emitting elements 122 of the light source module 120 may be disposed to substantially correspond to each other.

Figure 8A:
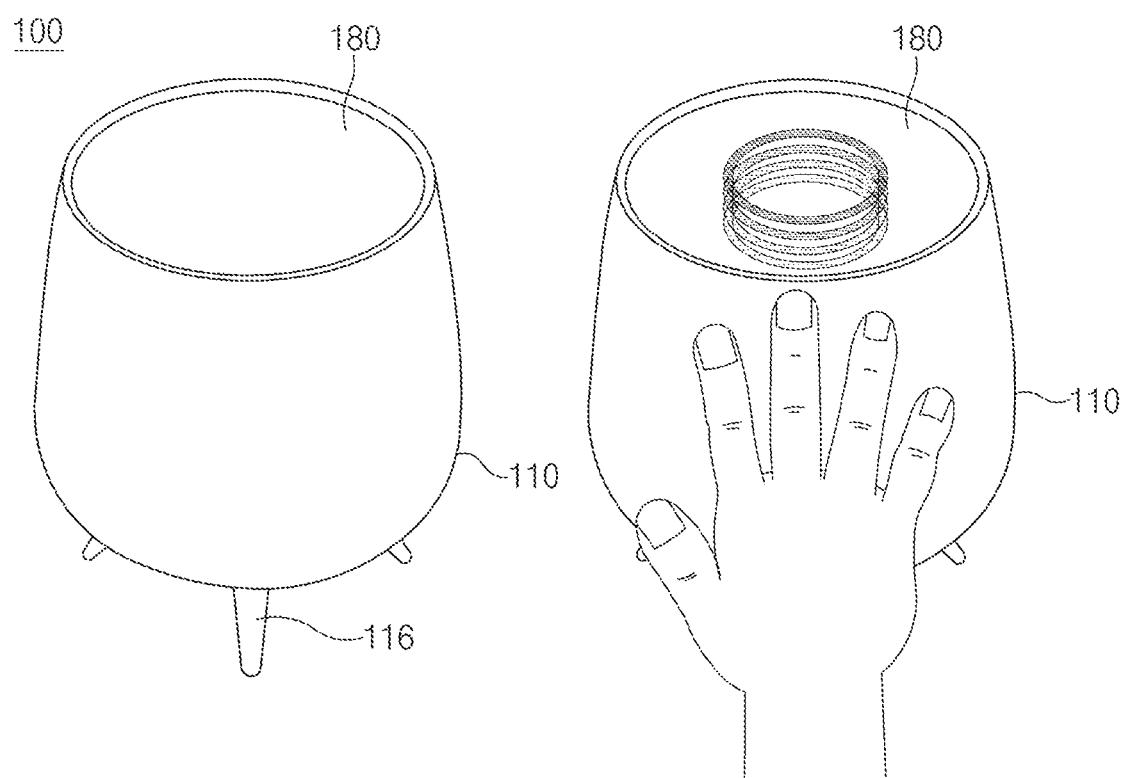
Figure 8C:
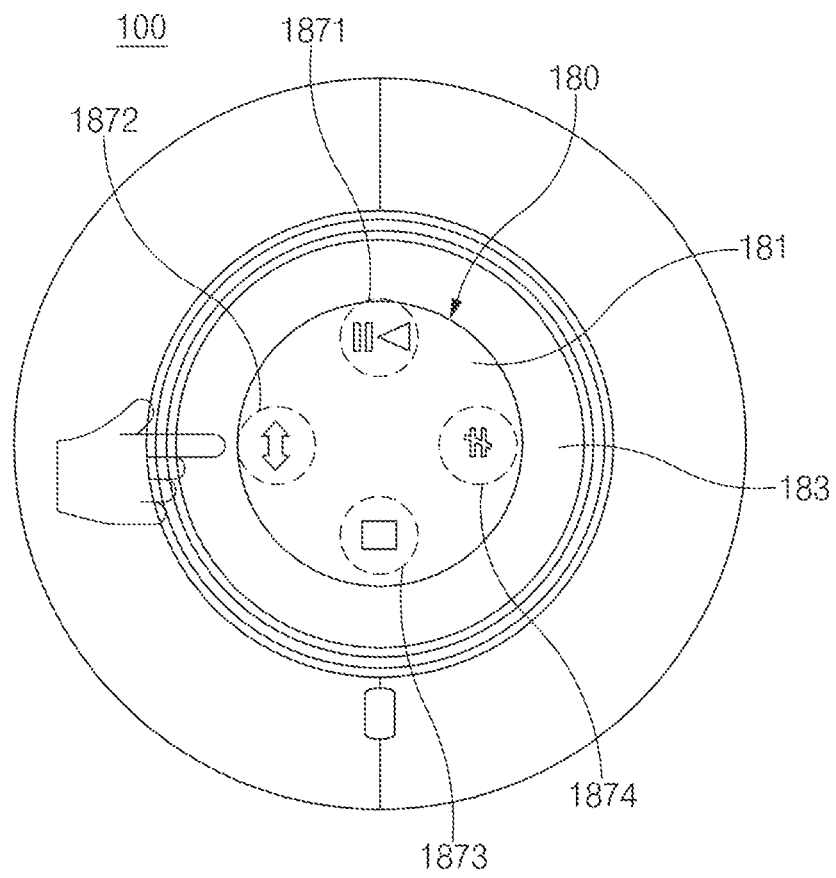

FIGS. 8A to 8C are views illustrating operations of the electronic device 100 according to various embodiments.

In various embodiments, the electronic device 100 may further include a processor (e.g., the processor 124 of FIG. 7) and one or more proximity sensors (not illustrated). The processor (e.g., the processor 124 of FIG. 7) may be disposed on at least one of a first PCB (e.g., the first PCB 121 of FIG. 2) that is included in the light source module, a second PCB (e.g., the second PCB 141 of FIG. 2) that is included in the microphone module 140, or a PCB included in the electronic device 100. The one or more proximity sensors (not illustrated) may be disposed on an outer surface of the housing 110. The proximity sensors may be disposed at predetermined intervals along the direction of the periphery of the housing 110.

FIG. 8A is a view illustrating an operation of displaying continuous patterns on the display area of the second window 180 when an object closely approaches the electronic device 100 in various embodiments. Referring to FIG. 8A, when an external object, such as a user's hand, approaches, continuous patterns may be displayed on the second window 180. As described above, the patterns may be patterns in which the shape of a first light-transmitting area (e.g., the first light-transmitting area 173 of FIG. 6) that is formed in a first reflective surface (e.g., the first reflective surface 174 of FIG. 6) of a first window (e.g., the first window 170 of FIG. 6) is continuously displayed.

FIG. 8B is a view illustrating an operation of detecting the direction of an external sound, such as a voice command of the user, and displaying light in the direction of the sound. In various embodiments, microphone elements (e.g., the microphone elements 142 of FIG. 7) (or, voice recognition sensors) of a microphone module (e.g., the microphone module 140 of FIG. 7) may recognize an external sound. The processor may determine the direction of the external sound, based on the sound recognized by the microphone elements 142. The processor may cause light-emitting elements corresponding to the direction of the external sound received by the microphone elements to emit light.

For example, when the external sound is a voice command of the user, the processor may cause light-emitting elements disposed in the direction toward the user to emit light. In another example, the processor may cause light emitting-elements (e.g., the light-emitting elements 122 of FIG. 7) of a light source module (e.g., the light source module 120 of FIG. 7) to emit light. When the voice command of the user is successfully recognized, continuous patterns may be displayed on the display area as illustrated in FIG. 8A.

In various embodiments, the light-emitting elements may be light-emitting elements included in the light source module (e.g., the light source module 120 of FIG. 7), or may be separate light-emitting elements disposed on the periphery of the second window 180 as illustrated in FIG. 8B.

FIG. 8C is a view illustrating a use state in which button shapes 1871, 1872, 1873, and 1874 related to control of the electronic device 100 or the speaker module 200 are displayed on the display area 181 of the second window 180 and the electronic device 100 or the speaker module 200 is operated by a touch on a region of the touch area 183 that is adjacent to each of the button shapes.

Referring to FIG. 8C, the second window 180 may include the display area 181 on which the button shapes are displayed and the touch area 183 surrounding the display area 181. The user may touch the touch area 183 adjacent to each of the button shapes 1871, 1872, 1873, and 1874 to control the electronic device 100 to perform an operation represented by the corresponding button shape. At this time, the button shapes 1871, 1872, 1873, and 1874 may be displayed by light passing through second light-transmitting areas (e.g., the second light-transmitting areas 1851, 1852, 1853, and 1854 of FIG. 6) that are formed in the second reflective surface 184 of the second window 180. For example, the first button shape 1871 may display playback/pause of the electronic device 100 or the speaker module 200, and the user may touch the touch area 183 adjacent to the first button shape 1871 to cause the electronic device 100 or the speaker module 200 to perform a playback/pause operation.

Figure 9:
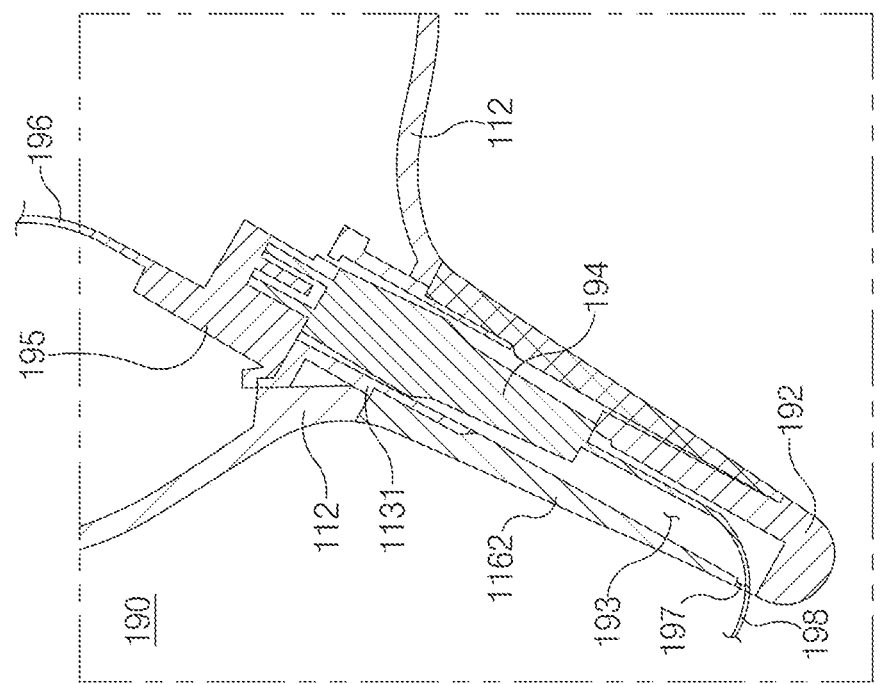
FIG. 9 is a view illustrating a power supply unit of the electronic device according to various embodiments.
Figure 9:
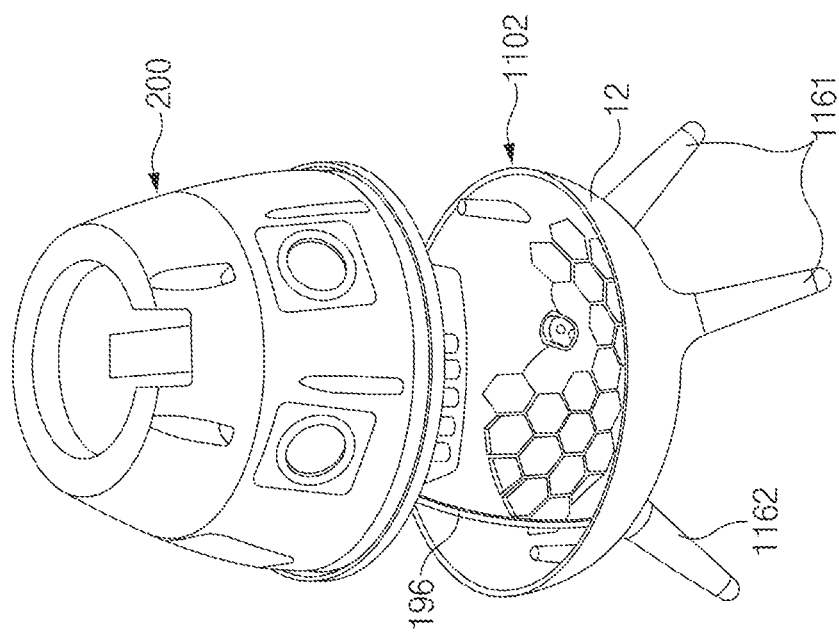

FIG. 9 is a view illustrating a power supply unit 190 of the electronic device 100 according to various embodiments.

In various embodiments, the electronic device 100 may include the housing 110, the speaker module 200 provided in the housing 110, the plurality of support members 116 extending from the housing 110 to support the electronic device 100, and the power supply unit 190 supplying power to the speaker module 200. As illustrated in FIG. 9, the support members 116 may include first support members 1161 and a second support member 1162 that is capable of supplying power to the electronic device.

Referring to FIG. 9, the power supply unit 190 may include a power module 195 disposed in the housing 110, a first power line 196 connecting the power module 195 with the speaker module 200 or the electronic device 100, the second support member 1162, a power terminal 194 at least partially disposed in the second support member 1162 and coupled to the power module 195, and a fixing member 192, at least part of which is disposed in the second support member 1162 to fix the power terminal 194.

In various embodiments, the second support member 1162 may have an empty space 193 formed therein. One side of the empty space 193 may be connected with the interior space of the housing 110, and an opposite side of the empty space 193 may be open. At least part of the fixing member 192 may be inserted into the empty space 193 through the open opposite side. The second support member 1162 may be coupled to the third surface 113 of the housing 110. For example, part of the housing 110 may include a protrusion 1131 having an opening connected with the empty space 193, and the protrusion 1131 and the second support member 1162 may be coupled such that the empty space 193 and the inside of the housing 110 are connected. Referring to FIG. 9, a thread may be formed on an outer surface of the protrusion 1131, and a corresponding thread corresponding to the thread may be formed on an inner surface of the second support member 1162. In another example, a thread may be formed on an inner surface of the protrusion 1131, and a corresponding thread corresponding to the thread may be formed on an outer surface of the second support member 1162.

In various embodiments, the power module 195 may be disposed in the housing 110. The power module 195 may be disposed adjacent to a portion connected with the empty space 193. The power module 195 may be connected with the speaker module 200 and/or the electronic device 100 through the first power line 196. Specifically, the power module 195 may be connected with a PCB included in the speaker module 200 or one or more of PCBs included in the electronic device 100 through the first power line 196.

In various embodiments, the power terminal 194 may be disposed in the empty space 193 of the second support member 1162. The power terminal 194 may be connected with the power module 195 and a second power line 198. The second power line 198 may extend outside the electronic device 100. The second power line 198 may extend to the outside through the open opposite side of the empty space 193.

Referring to FIG. 9, the fixing member 192 may be coupled to an opposite side of the second support member 1162. Part of the fixing member 192 may be coupled to the open opposite side of the second support member 1162, and the remaining part may be inserted into the empty space 193 of the second support member 1162. The fixing member 192 may be formed of a composition containing a rubber material. The fixing member 192 inserted into the empty space 193 may support a portion of the power terminal 194, thereby preventing the power terminal 194 from being separated from the power module 195. An opening 197 through which the second power line 198 extends to the outside may be formed between the fixing member 192 and the second support member 1162.

In various embodiments, the power supply unit 190 may be implemented by coupling the power terminal 194 to the power module 195, coupling the second support member 1162 to the protrusion 1131, and inserting the fixing member 192 into the second support member 1162.

Figure 10:
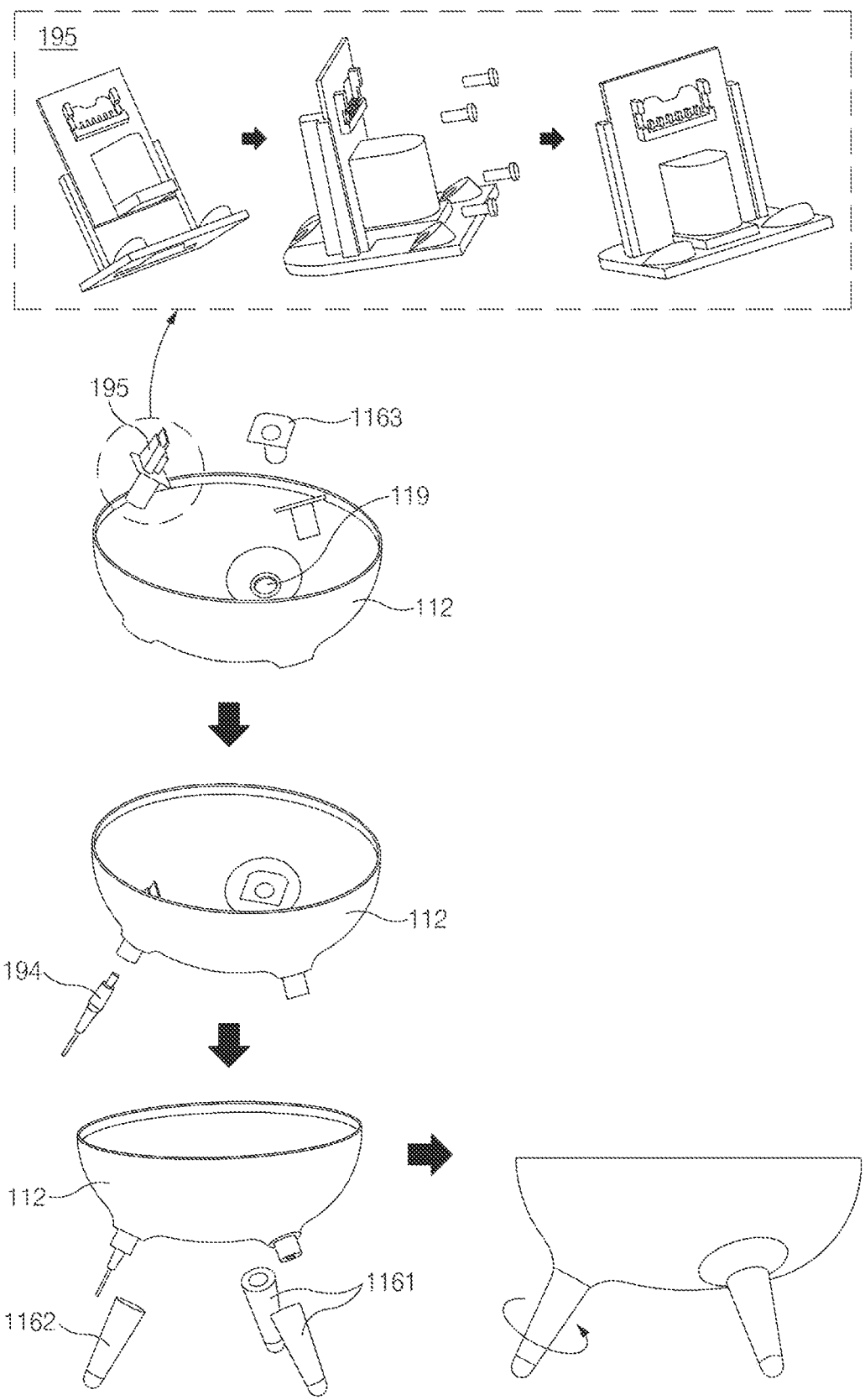
FIG. 10 is a view illustrating assembly of the power supply unit of the electronic device according to various embodiments.

FIG. 10 is a view illustrating assembly of the power supply unit of the electronic device according to various embodiments.

Referring to FIG. 10, the electronic device may include openings 119 formed in the second surface 112 of the housing and support brackets 1163 inserted into the openings 119. The openings 119 may be formed in areas corresponding to the first support members 1161 and the second support member 1162. The support brackets 1163 may protrude from the second surface 112 of the housing by being inserted into the openings 119. The support brackets 1163 may be inserted from the inside to the outside of the housing. The first support members 1161 and the second support member 1162 may be coupled to the support brackets 1163 protruding from the outer surface of the housing. As illustrated in FIG. 10, the support members 1161 and 1162 may be coupled to the support brackets 1163 by being rotated.

In the illustrated embodiment, the support bracket 1163 to which the second support member 1162 is coupled, among the support brackets 1163, may further include the power module 195. The power module 195 may be connected with the power terminal 194 inserted into the second support member 1162. In the illustrated embodiment, the support brackets 1163 may be inserted into the openings 119 formed in the housing. Thereafter, the power terminal 194 may be coupled to the support bracket 1163 to which the power module 195 is coupled, among the support brackets 1163. The second support member 1162 may be coupled to the support bracket 1163 to which the power terminal 194 is coupled, among the support brackets 1163. The first support members 1161 may be coupled to the remaining support brackets 1163.

In various embodiments, an electronic device 100 may include a housing 110 including a first surface 111, a second surface 112 that faces the first surface 111, and a third surface 113 that surrounds an interior space between the first surface 111 and the second surface 112, a support member 116 extending outward from the housing 110 to support the housing 110, a speaker module 200 disposed in the interior space, a first window 170 that is disposed between the first surface 111 and the speaker module 200 and that includes a first light-transmitting surface 172 that faces toward the first surface 111 and a first reflective surface 174 that faces away from the first light-transmitting surface 172, a second window 180 that is disposed between the first window 170 and the first surface 111 and that includes a second light-transmitting surface 182 that faces toward the first surface 111 and a second reflective surface 184 that faces away from the second light-transmitting surface 182, a light source module 120 disposed between the first window 170 and the speaker module 200, and a light diffusion member 130 disposed between the light source module 120 and the first reflective surface 174, and the first window 170 may include a light-transmitting area 173 formed in at least part of the first reflective surface 174 to transmit light diffused by the light diffusion member 130.

In various embodiments, the second light-transmitting surface 182 may form the first surface 111 of the housing 110.

In various embodiments, the first light-transmitting surface 172 and the second light-transmitting surface 182 may be disposed to face in a first direction, and the first reflective surface 174 and the second reflective surface 184 may be disposed to face in a second direction opposite to the first direction.

In various embodiments, the second reflective surface 184 may be supported by the first light-transmitting surface 172.

In various embodiments, the first reflective surface 174 may be disposed on the light diffusion member 130, and the light source module 120 may include one or more light-emitting elements 122 at least partially aligned with the light-transmitting area 173 formed in the first reflective surface 174.

In various embodiments, the light diffusion member 130 may be spaced apart from the light source module 120 at a predetermined interval.

In various embodiments, the housing 110 may further include an inner bracket 118 on which the light source module 120 is disposed, and the light diffusion member 130 may include a first portion (e.g., the light diffusion portion 131) on which the first window 170 is disposed and a second portion (e.g., the support portion 132) extending from the first portion to the inner bracket 118 to space the first portion apart from the light source module 120 at a predetermined interval.

In various embodiments, the housing 110 may include a recess 117 formed on at least part of the first surface 111, and the first window 170 may be disposed such that at least part thereof covers the recess 117.

In various embodiments, the first surface 111 of the housing 110 may have, on at least part thereof, a recess 117 in which the light source module 120, the light diffusion member 130, and the first window 170 are disposed, and at least part of the second window 180 may be supported on a portion around the recess 117.

In various embodiments, the second window 180 may include a display area 181 corresponding to the recess 117 and a touch area 183 supported by the portion around the recess 117, and the electronic device may further include a touch screen panel 160 disposed between the touch area 183 and the portion around the recess 117 so as to correspond to the touch area 183.

In various embodiments, the touch screen panel 160 may include a touch button 185 that controls operation of the electronic device 100.

In various embodiments, a button shape 187 related to the operation of the electronic device 100 that the touch button 185 controls is displayed on the display area 181.

In various embodiments, the touch button 185 may include a first touch button 185 and a second touch button 185, and a second light-transmitting area and a third light-transmitting area may be displayed on the second reflective surface 184 included in the second window 180. The second light-transmitting area may be adjacent to the first touch button 185 and may have a button shape 187 related to operation of the electronic device 100 that the first touch button 185 controls, and the third light-transmitting area may be adjacent to the second touch button 185 and may have a button shape 187 related to operation of the electronic device 100 that the second touch button 185 controls.

In various embodiments, the second light-transmitting area and the third light-transmitting area may have a higher light transmittance than other areas of the second reflective surface 184.

In various embodiments, the housing 110 may further include an inner bracket 118. The inner bracket 118 may include a recess portion 117 in which the light source module 120, the light diffusion member 130, and the first window 170 are disposed and a peripheral portion that surrounds the recess portion 117 and that is coupled to an inner surface of the housing 110. Part of the second window 180 may cover the recess portion 117, and the remaining part may be supported by the peripheral portion.

In various embodiments, the electronic device 100 may further include a processor and a microphone module 140 including a plurality of microphone elements 142, at least part of the microphone module 140 being disposed on the peripheral portion. The processor may be configured to control the electronic device 100, based on a sound signal received from the microphone elements 142.

In various embodiments, the light source module 120 may include a plurality of light-emitting elements 122, and when the sound signal received from the microphone elements 142 is a voice command related to operation of the electronic device 100, the processor may be configured to cause at least some of the plurality of light-emitting elements 122 included in the light source module 120 to emit light.

In various embodiments, a lighting device may include a housing 110, a light source module 120 that is disposed in the housing 110 and that includes one or more light-emitting elements 122, a light diffusion member 130 disposed in the housing 110 and disposed in a first direction of the light source module 120, a first window 170 disposed in the housing 110 and disposed in a first direction of the light diffusion member 130, and a second window 180 that is disposed in a first direction of the first window 170 and that forms a first surface 111 of the housing 110. The first window 170 and the second window 180 may include a first reflective surface 174 and a second reflective surface 184, respectively, which face in a second direction. The first reflective surface 174 may have a first light transmittance, and the second reflective surface 184 may have a second light transmittance higher than the first light transmittance. A first area (e.g., the first light-transmitting area 173) having a third light transmittance higher than the first light transmittance may be formed in the first reflective surface 174 to pass light diffused by the light diffusion member 130. A reflection space 133 in which the light passing through the first area of the first reflective surface 174 is repeatedly reflected may be formed between the first reflective surface 174 and the second reflective surface 184.

In various embodiments, the light diffusion member 130 may be spaced apart from the one or more light-emitting elements 122 at a predetermined interval in the first direction.

In various embodiments, the first window 170 included in the reflection space 133 may have a fourth light transmittance substantially the same as the third light transmittance, and the fourth light transmittance may be substantially the same as the light transmittance of air.

The electronic devices (e.g., the electronic device 100 of FIG. 1) according to the various embodiments disclosed in the disclosure may be various types of devices. The electronic devices may include, for example, a portable communication device (e.g., a smartphone), a computer device, a portable multimedia device, a mobile medical appliance, a camera, a wearable device, a speaker device, a lighting device, a speaker device including artificial intelligence, a lighting device including artificial intelligence, or a home appliance. The electronic devices according to embodiments of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., a program) including one or more instructions stored in a storage medium (e.g., an internal memory or an external memory) readable by a machine (e.g., the electronic device 100 of FIG. 1). For example, a processor (e.g., the processor 124 of FIG. 2) of the machine may call at least one of the stored one or more instructions from the storage medium and may execute the at least one instruction called. This means that the machine may perform at least one function based on the called at least one instruction. The one or more instructions may include a code generated by a compiler or executable by an interpreter. The machine-readable storage medium may be provided in the form of a non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The invention claimed is:

1. An electronic device comprising:
a housing including a first surface, a second surface configured to face the first surface, and a third surface configured to surround an interior space between the first surface and the second surface;
a support member extending outward from the housing to support the housing;
a speaker disposed in the interior space;
a first window disposed between the first surface and the speaker, the first window including a first light-transmitting surface configured to face toward the first surface and a first reflective surface configured to face away from the first light-transmitting surface;
a second window disposed between the first window and the first surface, the second window including a second light-transmitting surface configured to face toward the first surface and a second reflective surface configured to face away from the second light-transmitting surface;
a light source disposed between the first window and the speaker; and
a light diffusion member disposed between the light source and the first reflective surface,
wherein the first window includes a light-transmitting area formed in at least part of the first reflective surface to transmit light diffused by the light diffusion member, and
wherein the first window and the second window are spaced apart with a gap therebetween.

2. The electronic device of claim 1,
wherein the first surface of the housing has, on at least part thereof, a recess in which the light source, the light diffusion member, and the first window are disposed, and
wherein at least part of the second window is supported on a portion around the recess.

3. The electronic device of claim 2,
wherein the second window includes a display area corresponding to the recess and a touch area supported by the portion around the recess, and
wherein the electronic device further comprises a touch screen panel disposed between the touch area and the portion around the recess so as to correspond to the touch area.

4. The electronic device of claim 3, wherein the touch screen panel includes a touch button configured to control operation of the electronic device.

5. The electronic device of claim 4,
wherein the touch button includes a first touch button and a second touch button, and wherein a second light-transmitting area and a third light-transmitting area are displayed on the second reflective surface included in the second window, wherein the second light-transmitting area is adjacent to the first touch button and has a button shape related to operation of the electronic device that the first touch button controls, and the third light-transmitting area is adjacent to the second touch button and has a button shape related to operation of the electronic device that the second touch button controls.

6. The electronic device of claim 5, wherein the second light-transmitting area and the third light-transmitting area have a higher light transmittance than other areas of the second reflective surface.

7. The electronic device of claim 4, wherein a button shape related to the operation of the electronic device that the touch button controls is displayed on the display area.

8. The electronic device of claim 1, wherein the second light-transmitting surface forms the first surface of the housing.

9. The electronic device of claim 1, wherein the first light-transmitting surface and the second light-transmitting surface are disposed to face in a first direction, and the first reflective surface and the second reflective surface are disposed to face in a second direction opposite to the first direction.

10. The electronic device of claim 1, wherein the second reflective surface is supported by the first light-transmitting surface.

11. The electronic device of claim 1,
wherein the first reflective surface is disposed on the light diffusion member, and
wherein the light source includes one or more light-emitting elements at least partially aligned with the light-transmitting area formed in the first reflective surface.

12. The electronic device of claim 1, wherein the light diffusion member is spaced apart from the light source at a predetermined interval.

13. The electronic device of claim 1,
wherein the housing further includes an inner bracket on which the light source is disposed, and
wherein the light diffusion member includes a first portion on which the first window is disposed and a second portion extending from the first portion to the inner bracket to space the first portion apart from the light source at a predetermined interval.

14. The electronic device of claim 1,
wherein the housing includes a recess formed on at least part of the first surface, and
wherein the first window is disposed such that at least part thereof covers the recess.

15. The electronic device of claim 1,
wherein the housing further includes an inner bracket,
wherein the inner bracket includes a recess portion in which the light source, the light diffusion member, and the first window are disposed and a peripheral portion configured to surround the recess portion and coupled to an inner surface of the housing, and
wherein part of the second window covers the recess portion, and the remaining part is supported by the peripheral portion.

16. The electronic device of claim 1, wherein a central portion of the second window is disposed over the first window, and a peripheral portion of the second window is disposed over a touch screen panel.

* * * * *